Feb. 25, 1969    T. R. FREDERIKSEN ET AL    3,429,462
SHAFT FURNACE DISCHARGE CONTROL
Filed April 14, 1967
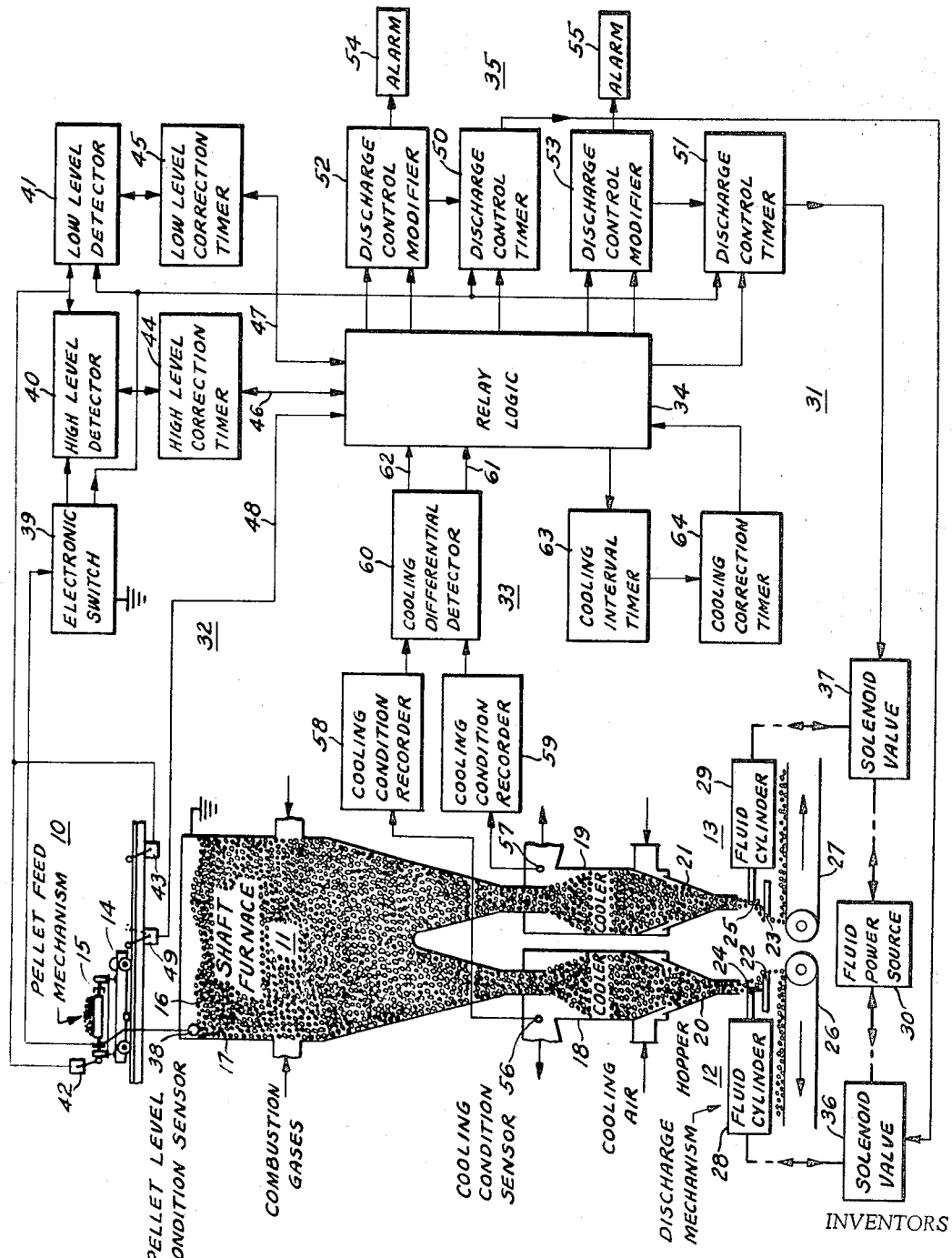
INVENTORS
Thomas R. Frederiksen
Warren K. Radtke

United States Patent Office 3,429,462
Patented Feb. 25, 1969

3,429,462
SHAFT FURNACE DISCHARGE CONTROL
Thomas R. Frederiksen and Warren K. Radtke, Bethlehem, Pa., assignors to Bethlehem Steel Corporation, a corporation of Delaware
Filed Apr. 14, 1967, Ser. No. 631,006
U.S. Cl. 214—18.2                    6 Claims
Int. Cl. F23k *3/06;* F27b *1/20*

ABSTRACT OF THE DISCLOSURE

Automatic controls are applied to the discharge mechanisms of a divided-shaft type of pellet indurating furnace to establish a nominal rate of pellet throughput and to adjust this rate to meet changes in furnace operating conditions. The nominal discharge rate for each leg of the furnace is set by respective discharge control means, this being automatically modified periodically by respective discharge control modifying means. The latter means is principally responsive to raw pellet level condition signal means, but periodically is over-ridden to become responsive to the difference in respective pellet cooling condition signal means. Alarm means is provided to alert an operator when a predetermined amount of change in discharge rate occurs.

BACKGROUND OF THE INVENTION

This invention relates to discharge control systems for vertical shaft furnaces, and more particularly to an automatic discharge control system for divided-shaft furnaces generally used for indurating iron ore pellets and the like.

Typical apparatus for indurating iron ore pellets, for example, is shown in P. L. Steffensen's U.S. Patents 3,003,156, issued Oct. 10, 1961, covering divided-shaft furnaces, and 3,137,398, issued June 16, 1964, relating to raw pellet feed apparatus for charging the top of the furnace. A discharge mechanism of conventional design, but not shown by Steffensen, is located beneath each hopper for discharging the indurated pellets after cooling to a safe handling temperature.

Under ideal operating conditions, maximum tonnages of the highest quality indurated pellets should discharge in equal amounts from each hopper. In practice, however, many variations in operating conditions are encountered which affect furnace performance and, of course, the properties of the indurated pellets. For example, the supply of pellets varies in moisture content as well as in the amount dust and fines entrained therewith. This causes uneven burning in both lateral and vertical sections of the furnace. As a result, gas channels develop and cause blow-throughs which re-distribute partially treated pellets and alter raw pellet level configuration on top of the furnace. In other instances, clinkers and/or clusters of overheated pellets form in an intermediate zone and hinder the passage of pellets therethrough. Consequently, pellet throughput time is either increased or decreased, thus causing their overheating or underheating in a manner affecting the properties of the discharged pellets.

Heretofore, it has been the practice for an operator to observe numerous operating gages while periodically inspecting the overall apparatus. He alone decided what measures were to be taken to improve operations such as by adjusting raw pellet level or rates of the discharge mechanisms. Frequently, the operator has been occupied with other duties and resorted to making either arbitrary or irregularly spaced adjustments, or omitted them entirely, thus perpetuating the foregoing deficiencies.

SUMMARY

It is therefore an object of this invention to provide an automatic discharge control system for improving the operation of a vertical shaft type of pellet indurating furnace.

Another object of this invention is to provide a control system which will automatically establish and modify discharge rates of pellets during variations in operating conditions of said furnace.

A further object of this invention is to provide said control system which will respond to changes in either raw material level conditions and to the differences in amount of pellet cooling in the legs of said furnace.

A still further object of this invention is to provide alarm means for producing an alarm signal when the modification in discharge rate exceeds a predetermined limit.

These and other objects and features of the present invention will become apparent from the following description and accompanying drawing.

BRIEF DESCRIPTION OF THE DRAWING

The single figure drawing is a schematic elevational view of a divided shaft furnace combined with a block diagram of the automatic control system according to the invention.

DESCRIPTION OF THE PREFERRED EMBODIMENT

Referring to the drawing, a typical installation for indurating iron ore pellets, for example, includes conventional pellet feed mechanism 10, divided-shaft type of pellet indurating furnace 11 and fluid operated discharge mechanisms 12 and 13, and the automatic discharge control system 31 of the present invention.

Feed mechanism 10 is provided with a shuttle car 14 and reciprocating belt conveyor 15 for depositing new layers of raw pellets upon the column of pellets 16 being heat-treated in furnace zone 17. The heat-treated pellets descend through left and right legs which include pellet coolers 18 and 19, wherein they are cooled and cleansed by a countercurrent flow of cooling air continuously supplied from an external source, and discharged through hoppers 20 and 21.

Cooled pellets are discharged by left and right discharge mechanisms 12 and 13 (which mechanisms respectively consist of the following even and odd numbered devices) by dropping them onto discharge tables 22 and 23, from which they are removed by reciprocating scraper bars 24 and 25 onto discharge conveyors 26 and 27, the latter devices operating at a constant speed. Scraper bars 24 and 25 may be driven by variable speed electric motors (not shown), or by reciprocating fluid cylinders 28 and 29 powered from fluid source 30 under control of automatic discharge control system 31.

Automatic discharge control system 31 is comprised of raw pellet level condition signaling means 32, pellet cooling condition signaling means 33, and means for dispatching pellet removal rate including relay logic 34, discharge control means 35 and discharge controllers 36 and 37.

The control system normally establishes a nominal high rate of pellet discharge based on height of pellet column 16, and periodically modifies this rate when column 16 average height deviates from a predetermined normal value, the average height being determined during each complete cycle of operation of feed mechanism 10. Holes in pellet column 16 are continuously detected during pellet delivery and cause the discharge rate to be shifted momentarily from a high to a low value. Pellet discharge rates are also modified periodically by differences in the amount of cooling occurring in each cooler 18 and 19, which differences cause momentary over-ride of the level control. This causes opposite rate changes in operation of cylinders 28 and 29, inversely proportional to the amount of cooling occurring in coolers 18 and 19, thus accommodating unbalanced passage of pellets through the furnace while maintaining a predetermined throughput. Alarms are provided for each of the discharge mechanisms to signal when the modification in discharge rate exceeds a predetermined value.

Raw pellet level condition signaling means 32 includes a conductive ball type of level sensor 38 supported insulatively from the structure of reciprocating conveyor 15 and connected to the input of electronic switch 39, the latter device having its input return through the raw (wet) pellets at 16. Level sensor 38 is held at a prescribed distance below conveyor 15 corresponding to the nominal height of pellet column 16, thereby to cause electronic switch to close when contacting pellets and to open when missing them as feed mechanism 10 traverses the top of furnace 11.

Electronic switch 39 is circuited to signal high level detector 40 only when contacting pellets and to signal low level detector 41 when missing pellets, their response being limited by action of switch 42 to when conveyor 15 is actually depositing raw pellets into furnace 11. Detectors 40 and 41 consist, for example, of motor-driven, repeat-cycle, electromechanical timers having a remotely controlled reset mechanism, and a manually adjustable running period correspondnig to at least one-half of the duration of the pellet feed cycle, this being about one minute in a 60 ton per hour indurating furnace. These timers are circuited to sum the duration of sensor 38 hits and misses, respectively, over each half of pellet column 16 and to be reset by mid-cycle action of switch 49 and by action of switch 43 which is tripped at the end point in each cyclic operation of feed mechanism 10.

The hit and miss durations accumulated by the timers in detectors 40 and 41, respectively, have correspondence with the amount of deviation above and below the aforesaid nominal pellet level, relative to pellet feed and removal rates and other known factors. The timers are preset to signal high and low level correction timers 44 and 45, respectively, after an expiration of about 75% of half of the feed cycle duration. The actual time interval is preselected in accordance with desired system response characteristics. Moreover, one timer duration may differ slightly from the other to compensate for different gravitational effects of various pellet column lengths on pellet removal rate.

High and low level correction timers 44 and 45 are of the adjustable electromechanical type similar to those in detectors 40 and 41. They differ in that each has about a 6 second adjustable running time and is respectively interlocked with the aforesaid timers. They are preset to issue respective high and low deviation correction signals enduring for about 3 seconds in circuits 46 and 47, respectively, during each half of the feed cycle in response to the signals from detectors 40 and 41. Circuits 46 and 47 are directed through relay logic 34 into discharge control means 35 as described below.

Relay logic 34 consists essentially of electrical relays circuited to enable, disable and transfer level condition signals of means 32 and cooling condition signals of means 33 to and from discharge control means 35 in a predetermined sequence. Discharge control means 35 is made responsive principally to level condition signals, including a transfer signal carried over circuit 48 responsive to the action of transfer switch 49. This switch causes level detectors 40 and 41 to be reset at mid-feed cycle, in addition to causing high and low level deviation correction signals at circuits 46 and 47 to be applied only to the particular discharge control means which corresponds to left or right leg of furnace 11 over which shuttle car 14 happens to be traversing. Periodically, cooling condition signals are caused to over-ride level condition signals and act momentarily on discharge control means 35 as will be explained below.

Although not shown, relay logic 34 includes a control voltage source for supplying all of the power needs of the entire control system.

Discharge control means 35 includes left and right discharge control timers 50 and 51, respectively, which operate continuously to provide discharge control signals. Each of these consist of standard electronic timers having a manually adjustable resistance-capacitance timing circuit preset to continuously produce a repetitive output pulse having about 50–50 on-off time at a nominal high rate of about 20 cycles per minute. The timing circuit is adapted for a 10 to 1 range change responsive to a momentary low level condition pulse from electronic switch 39, indicative of a hole in pellet column 16 and a requirement for momentarily slowing down pellet discharge rate. The timing circuit is further adapted to be modified about plus or minus 15% by corresponding discharge control modifier 52 or 53. The repetitive output pulses from discharge control timers 50 and 51 are circuited to discharge controllers 36 and 37.

Discharge control modifiers 52 and 53 each consist of a manually adjustable reversably motor-driven potentiometer having a resistance element connected to modify the resistance-capacitance timing circuit about plus or minus 15% in corresponding discharge control timer 50 or 51. Each modifier has separate uni-directional drive motors coupled to the potentiometer shaft and has motor leads circuited to relay logic 34 to individually effect an increase or decrease in discharge rate as described below.

When relay logic 34 sequence is in the level condition mode, both discharge control modifiers 52 and 53 are circuited to operate in unison to either increase or decrease both pellet discharge rates in a direct relation to correction signal at 46 and 47.

Each discharge control modifier 52 and 53 includes high and low limit switches operatively associated with respective alarm means 54 and 55, thereby to signal an operator when the modification in discharge rates exceeds predetermined limits.

Discharge controllers 36 and 37 operate responsive to the signals supplied by discharge control means 50 and 51, respectively. When discharge mechanisms 12 and 13 are operated by reciprocating fluid cylinders 28 and 29, then controllers 36 and 37 consist of solenoid valves circuited with fluid source 30 to power the cylinders in both directions at a rate determined by discharge control pulse frequency. Alternatively, when electric motors power the discharge mechanisms, then electric controllers adapted to respond to the discharge control pulses would, of course, be substituted for the solenoid valves and fluid circuitry.

Pellet cooling condition signaling means 33 includes cooling condition sensors 56 and 57, preferably thermocouples, located in or near the cooling air outlet of pellet coolers 18 and 19. These send a millivolt signal to the input of cooling condition recorders 58 and 59 relative to the amount of pellet cooling occurring in the coolers. Recorders 58 and 59 are the conventional industrial type, either electric or electropneumatic, each being adapted to transmit either an electric or a pneumatic proportional signal to the input of cooling differential detector 60.

Depending on the nature of the transmitted cooling condition signal, cooling differential detector 60 may be a conventional electric or pneumatic differential relay, or a standard U-tube mercury manometer, each having two sets of electrical contacts adjusted to close separately on a predetermined difference in the amount of pellet cooling. One set of contacts closes and energizes circuit 61 to relay logic 34 when the temperature at sensor 57 is greater than 56, thus indicating the requirement to reduce the rate of operation of discharge mechanism 13 and increase the rate of discharge mechanism 12 to maintain a predetermined amount of pellet throughput. The other set of contacts closes and energizes circuit 62 to relay logic 34 when the temperature at sensor 56 is greater than at 57, thus indicating the opposite requirement of above.

When relay logic 34 is periodically caused to switch from level condition mode to cooling condition mode as noted below, discharge control modifiers 52 and 53 are connected with circuits 61 and 62 for producing opposite rate changes in discharge mechanisms 13 and 12 inversely to a predetermined difference in the amount of pellet cooling as noted above.

Cooling interval timer 63 and cooling correction timer 64 are repeat cycle electromechanical timers similar to timers 40 and 41. Timer 63 is circuited and preset to continuously signal timer 64 once about every 8 minutes, this interval being preselected in accordance with desired system response characteristics. Cooling correction timer 64 is circuited and preset to issue about a 3 second pulse about every 8 minutes to relay logic 34 to over-ride the level condition mode and transfer the connections of discharge control modifiers 52 and 53 from level condition circuits 46 and 47 to cooling condition circuits 62 and 61, respectively.

OPERATION

Still referring to the drawing, assume that pellet feed mechanism is ready to start its cycle, that switches 42, 43 and 49 are in the positions shown, that furnace 11 is operating normally, that all timers have been manually preset as noted above so as to cause discharge mechanisms 12 and 13 to operate at about 20 strokes per minute normal high rate and that relay logic 34 is operating in the level condition control mode.

As pellet feed mechanism 10 is caused to traverse pellet column 16, sensor 38 signals the electronic switch 39 and high and low level detectors 40 and 41 to register the irregular surface of pellet column 16. When a hole (not shown) appears in the pellet surface traversed by sensor 38, electronic switch 39 signals both discharge control timers 50 and 51 to shift momentarily into a low discharge rate of about 2 strokes per minute until feed mechanism 10 corrects the level deficiency.

When the average height of pellet column 16 deviates above the normal operating level, detector 40 times-out before being reset and signals correction timer 44 to send a 3 second correction pulse over circuit 46. Relay logic 34 directs this pulse to the "increase rate" drive-motor in discharge control modifier, 52 or 53, which is pre-selected by transfer switch 49. This causes an increase in discharge rate at one of the corresponding discharge mechanisms 12 or 13. The discharge rate will continue to be modified upward on subsequent feed cycles until modifier 52 or 53 attains its capacity for correction. When this occurs, alarm means 54 or 55 signals the furnace operation to take other corrective measures. The alarm is reset by manually adjusting the potentiometer in modifiers 52 and 53 to a neutral position.

When the average height of pellet column 16 deviates below the normal operating level, control system 31 operates in a manner similar to that described above, except that it causes discharge mechanism 12 or 13 to decrease their pellet removal rate.

If, for example, the discharge of heat-treated pellets is impeded in the left leg of furnace 11, cooling condition sensor 56 detects a drop in temperature and causes differential detector 60 to send a signal over circuit 62 to relay logic 34. When cooling interval timer 63 signals correction time 64 to over-ride the level condition mode, the signal at circuit 62 is transferred to operate on discharge control modifiers 52 and 53. This causes discharge mechanisms 12 and 13 to increase and decrease, respectively. The discharge rates of each mechanism will continue to increase and decrease, respectively, every 8 minutes until modifier 52 or 53 attains its capacity for correction and causes alarm means 54 or 55 to signal the operator as noted above.

Control system 31 operates in a similar manner when the discharge of heat-treated pellets is impeded in the right leg of furnace 11.

While the best embodiments of the present invention have been shown and described, the invention is not to be considered as limited to the exact embodiments herein shown, but it is intended to include modifications, substitutions, and equivalents within the scope and spirit of the appended claims.

We claim:

1. A discharge control system for vertical divided-shaft indurating furnaces having a discharge mechanism operative on each leg of the furnace in dependency of a discharge control signal, comprising:
   (a) first means for signaling the level condition of a pellet column at the top of said furnace;
   (b) second means for signaling the amount of pellet cooling occurring in legs of the furnace;
   (c) third means responsive to the signals of the first and second means for issuing separate dicharge control signals to each discharge mechanism, thereby automatically dispatching pellet removal rate according to furnace operating conditions.

2. The control system of claim 1 wherein the first means includes detecting means associated with a traveling level sensor for producing deviation signals when the pellet column height differs from a predetermined nominal level.

3. The control system of claim 1 wherein the second means includes cooling differential detecting means for producing opposite rate changes in said discharge mechanisms inversely proportional to a predetermined difference in the amount of pellet cooling occurring in said furnace legs.

4. The control system of claim 1 wherein the third means includes means for establishing a nominal discharge rate based on pellet column height.

5. The control system of claim 1 wherein the third means includes means for establishing a nominal discharge rate and means responsive to said level and cooling signals for modifying said discharge rate.

6. The control system of claim 5 further including means for producing an alarm signal when the modification in discharge rate exceeds a predetermined limit.

References Cited

UNITED STATES PATENTS 2,655,365 10/1953 Trask et al. _____ 263—29
3,094,316  6/1963 Turin _____ 263—29

GERALD M. FORLENZA, *Primary Examiner.*

U.S. Cl. X.R.

263—29